(12) United States Patent
Villiere et al.

(10) Patent No.: US 6,340,187 B1
(45) Date of Patent: Jan. 22, 2002

(54) ACCESSORY FIXING DEVICE

(75) Inventors: Franck Villiere, Lyons; Alain Marcellin, Jujurieux, both of (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 09/559,628

(22) Filed: Apr. 27, 2000

(30) Foreign Application Priority Data

Apr. 30, 1999 (FR) .............................................. 99 05524

(51) Int. Cl.$^7$ ............................................... B60R 19/34
(52) U.S. Cl. ........................ 293/155; 293/117; 190/167; 190/169; 342/70
(58) Field of Search ................................. 293/155, 117; 190/167–169; 342/70–72; 81/3.7, 485, 486

(56) References Cited

U.S. PATENT DOCUMENTS

| | | | | |
|---|---|---|---|---|
| 2,231,312 A | * | 2/1941 | Ache ........................... | 293/117 |
| 2,807,899 A | * | 10/1957 | Adams ........................ | 296/117 |
| 3,794,997 A | * | 2/1974 | Iwatsuki et al. ............ | 293/117 |
| 4,387,920 A | * | 6/1983 | Slaughter et al. .......... | 293/117 |
| 4,636,997 A | | 1/1987 | Toyama et al. | |
| 4,996,634 A | * | 2/1991 | Haneda et al. .............. | 293/117 |
| 5,288,117 A | * | 2/1994 | Vogelgesang ............... | 293/117 |
| 5,364,158 A | * | 11/1994 | Watanabe et al. .......... | 293/155 |
| 5,423,487 A | * | 6/1995 | Kim ............................ | 293/117 |
| 5,560,662 A | * | 10/1996 | Apgar, Jr. et al. .......... | 293/155 |
| 5,833,283 A | * | 11/1998 | Shaw ......................... | 293/117 |
| 5,844,471 A | | 12/1998 | Daniel | |
| 6,039,367 A | * | 3/2000 | Muller et al. ............... | 293/117 |
| 6,176,530 B1 | * | 1/2001 | Gollungberg ............... | 293/155 |

FOREIGN PATENT DOCUMENTS

| | | | |
|---|---|---|---|
| DE | 3939387 | * 11/1989 | |
| WO | WO-26155 | * 1/1997 | ................. 293/117 |

* cited by examiner

*Primary Examiner*—Joseph D. Pape
*Assistant Examiner*—Kiran B. Patel
(74) *Attorney, Agent, or Firm*—Oliff & Berridge, PLC

(57) ABSTRACT

The invention relates to a device for fixing an accessory such as a positioning sensor to a bodywork part of a motor vehicle, said accessory being found on the side of the bodywork part that faces towards the inside of the vehicle and in register with an orifice made through said bodywork part. It comprises a jacket suitable for containing the accessory, and a support suitable for being secured to the bodywork part on the side of said bodywork part that faces towards the inside of the vehicle, the jacket containing the accessory being suitable for being received inside the support by being inserted from the outside of the vehicle through the orifice formed in the bodywork part, said jacket containing the accessory also being suitable for being withdrawn from the support from the outside of the vehicle by being extracted through the orifice formed in the bodywork part.

21 Claims, 9 Drawing Sheets

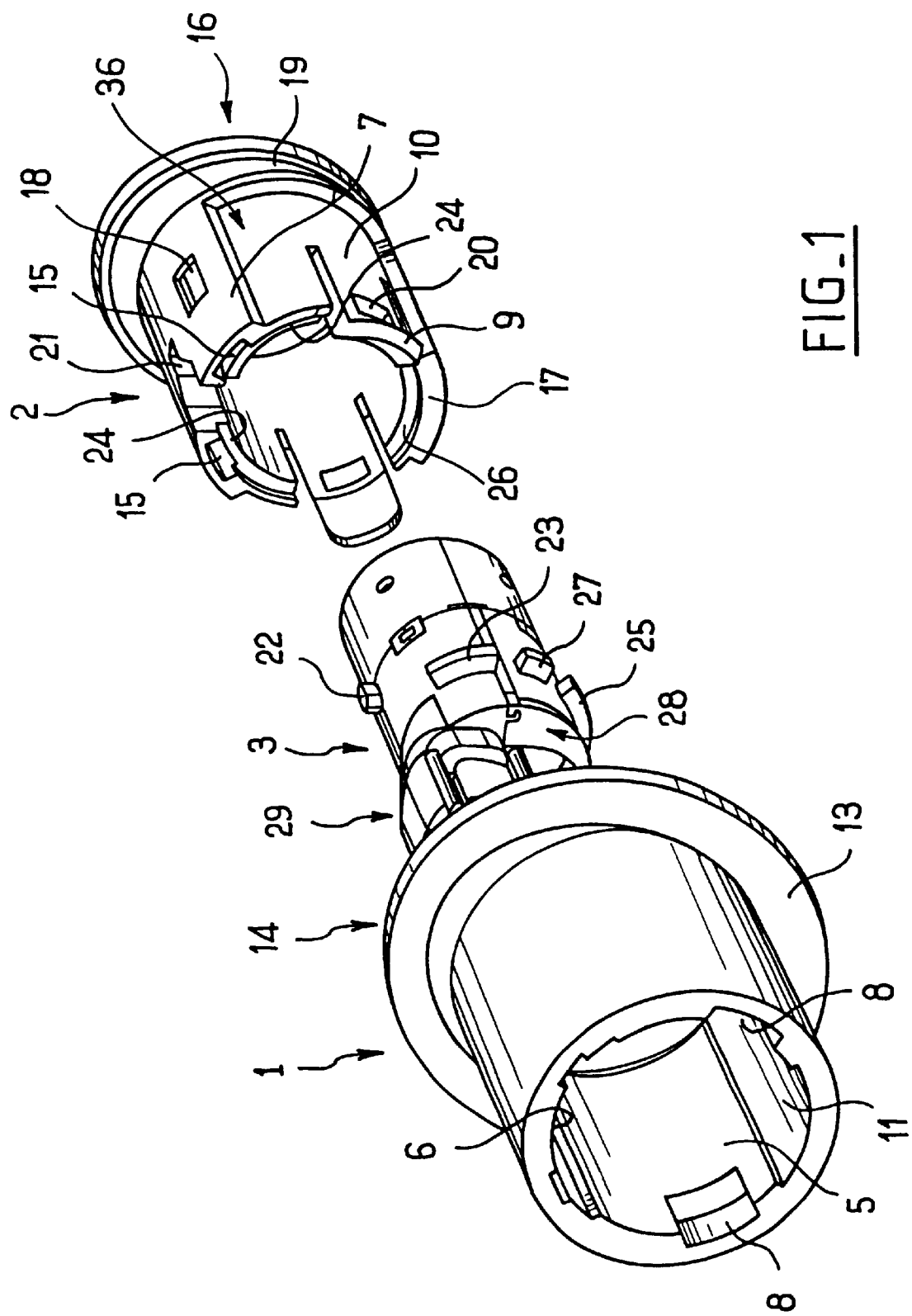
FIG_1

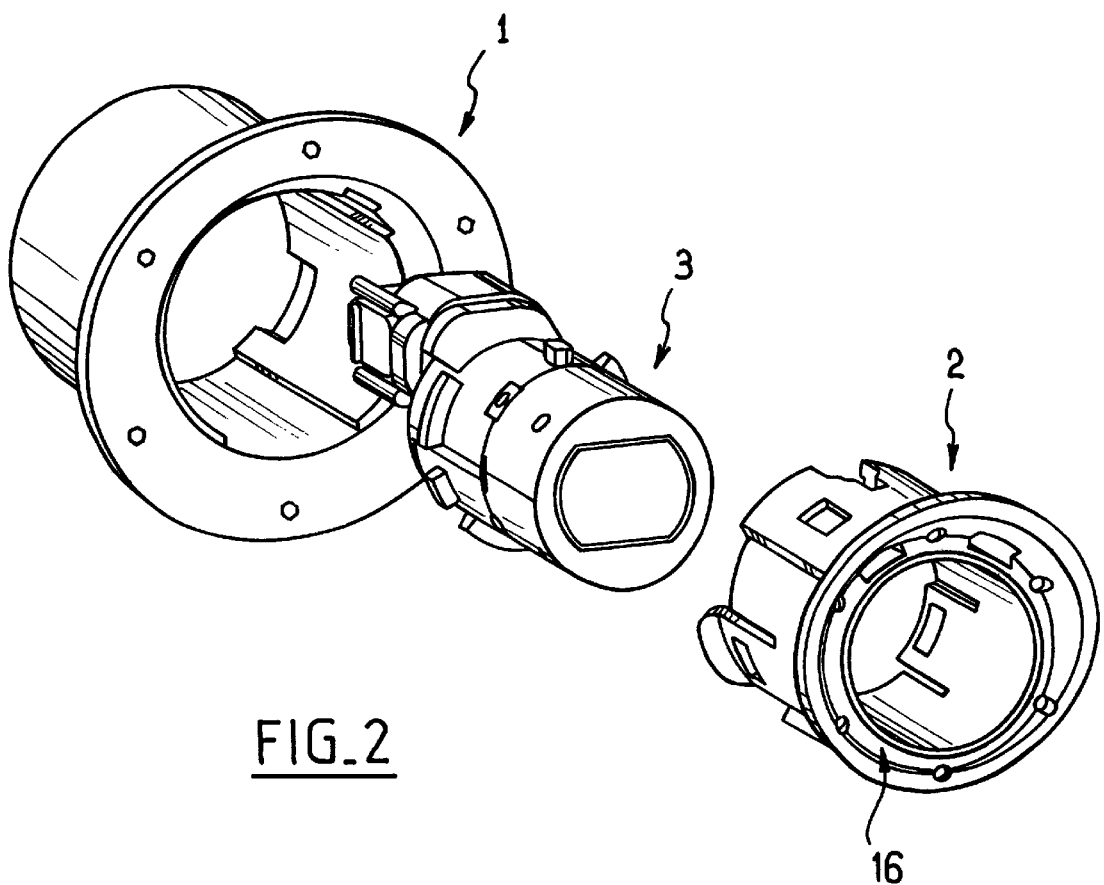
FIG_2
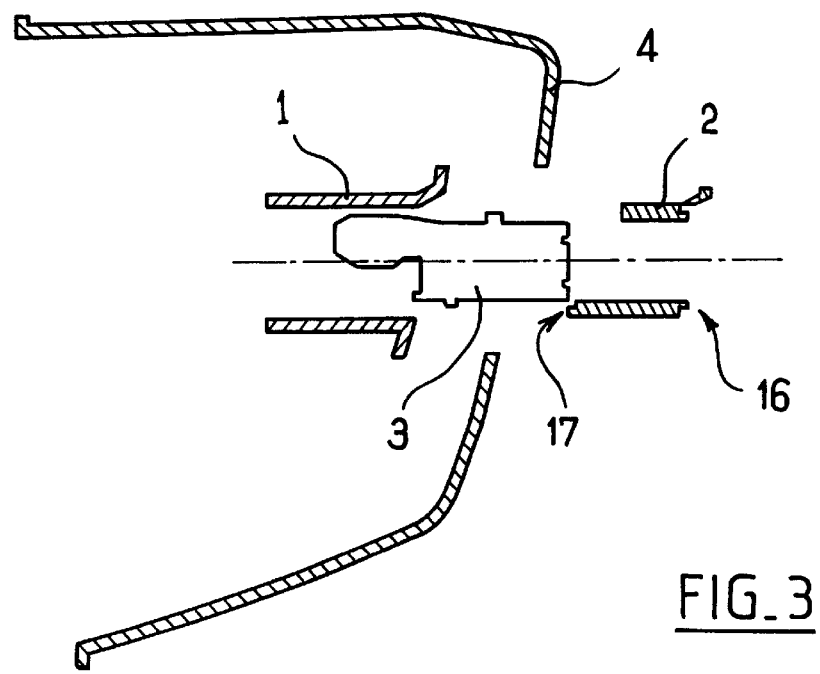
FIG_3

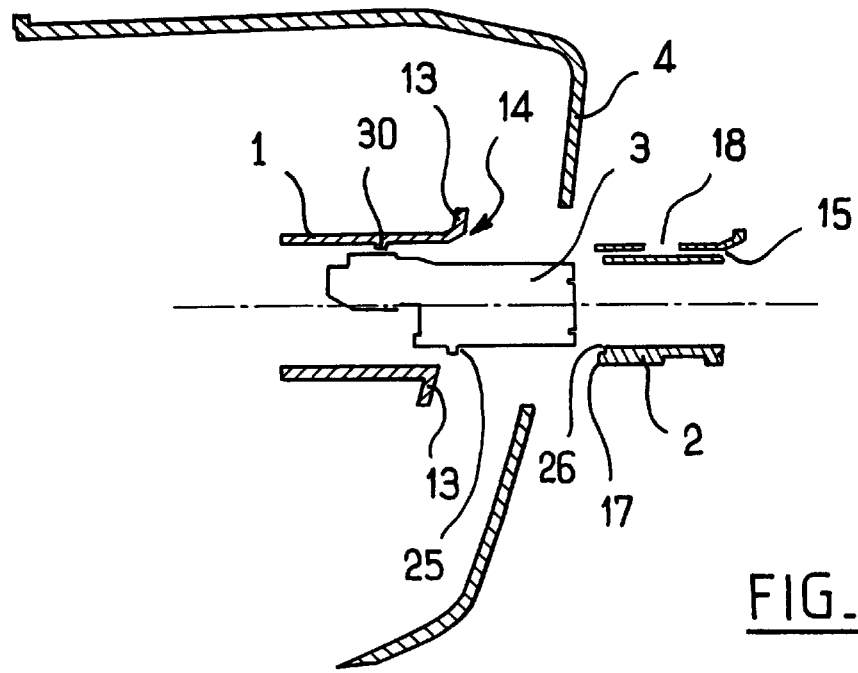
FIG_4
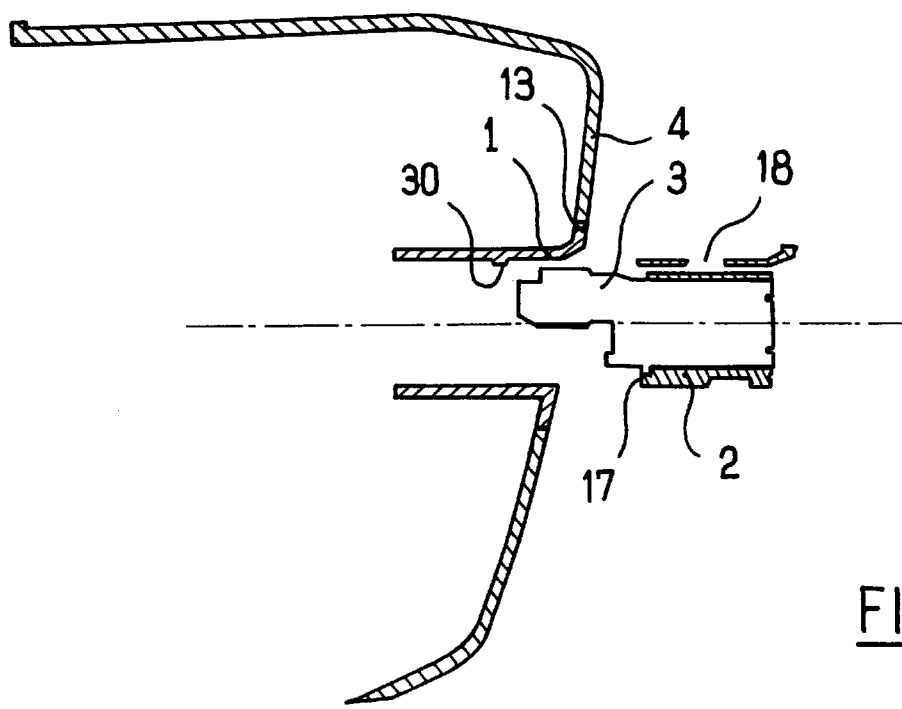
FIG_5

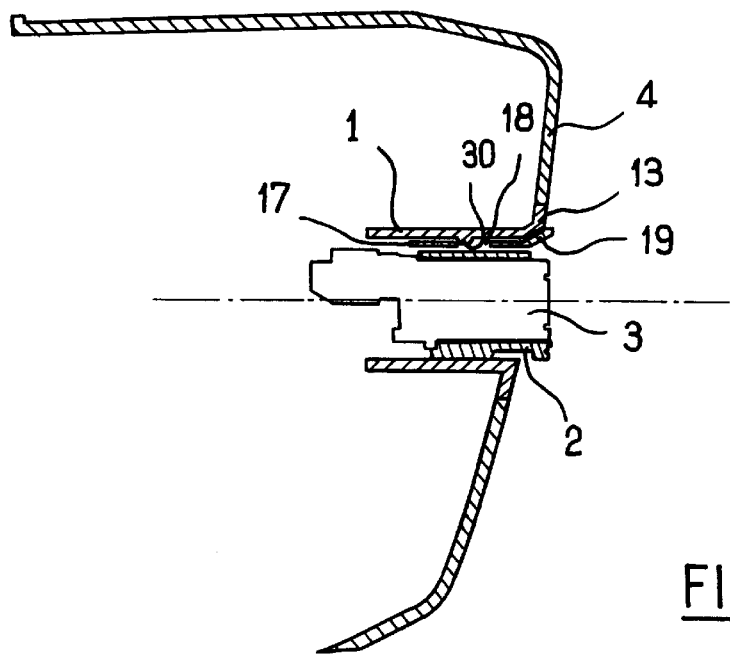
FIG_6
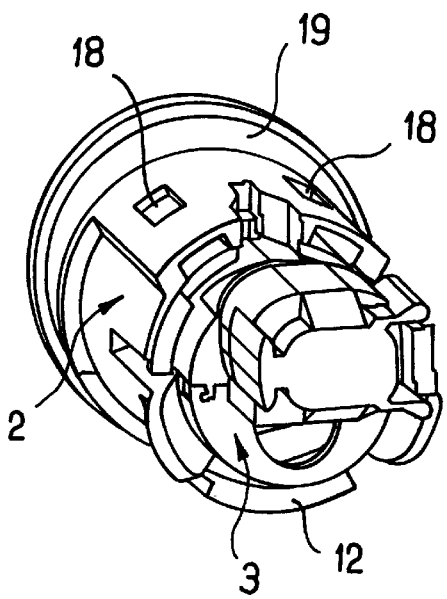
FIG_7
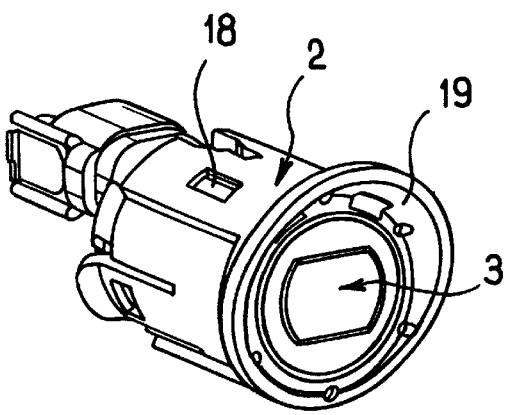
FIG_8

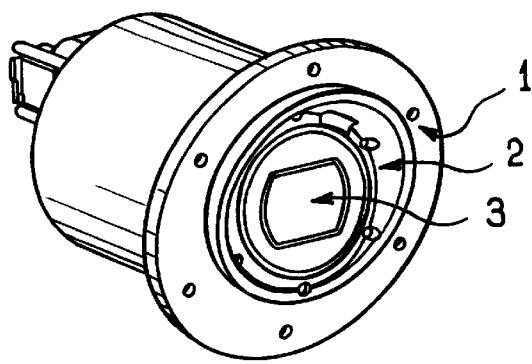
FIG_9
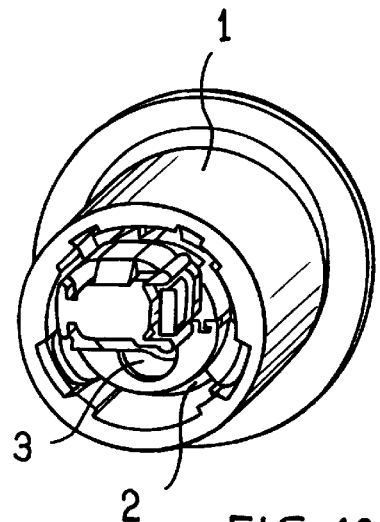
FIG_10
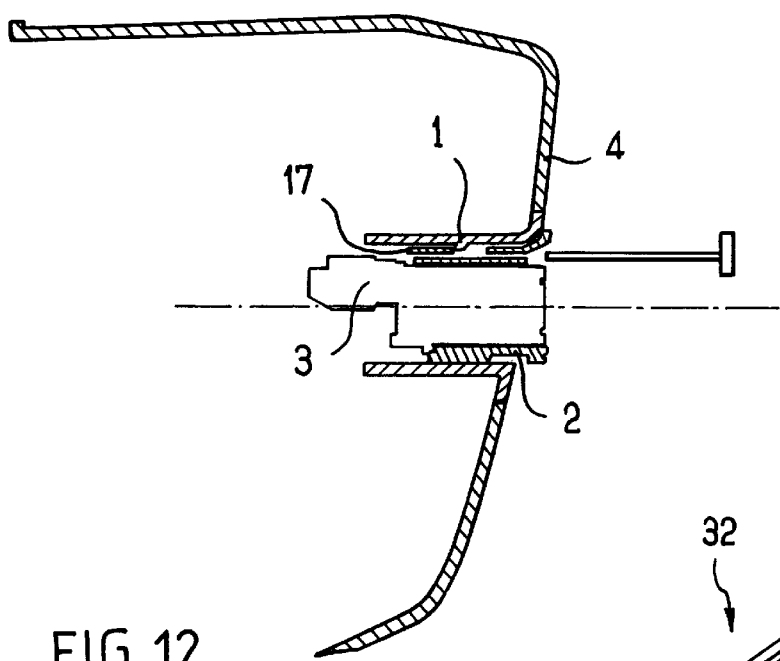
FIG_12
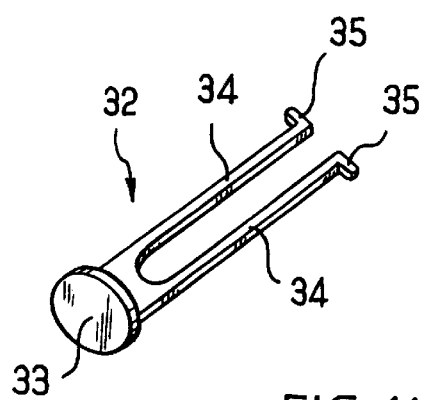
FIG_11

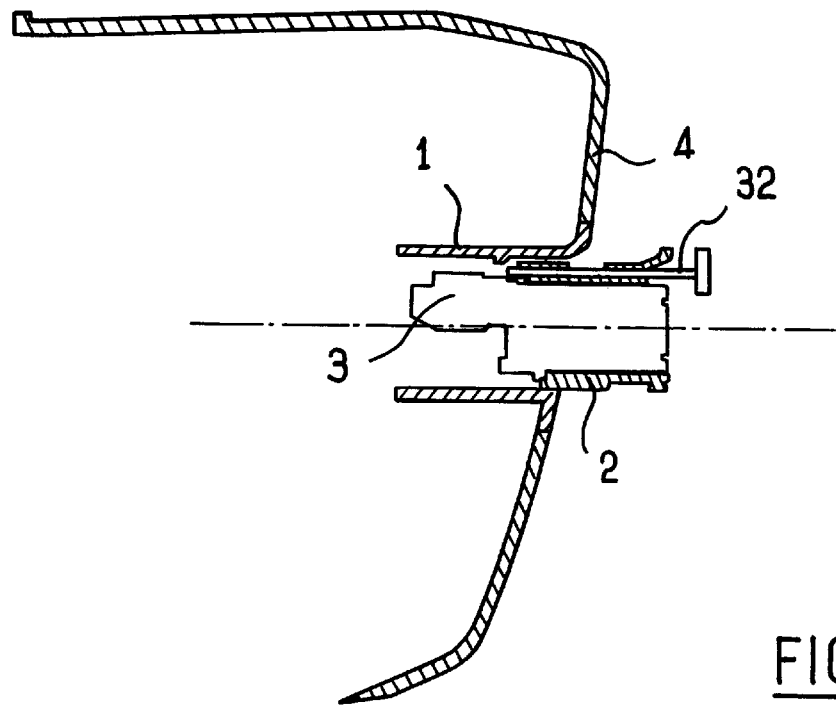
FIG_13
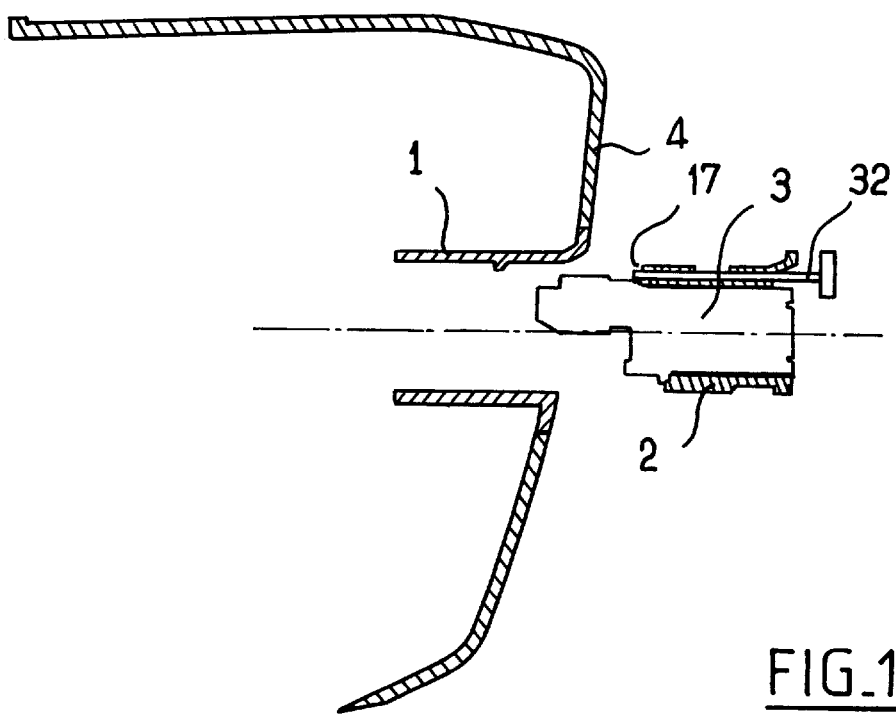
FIG_14

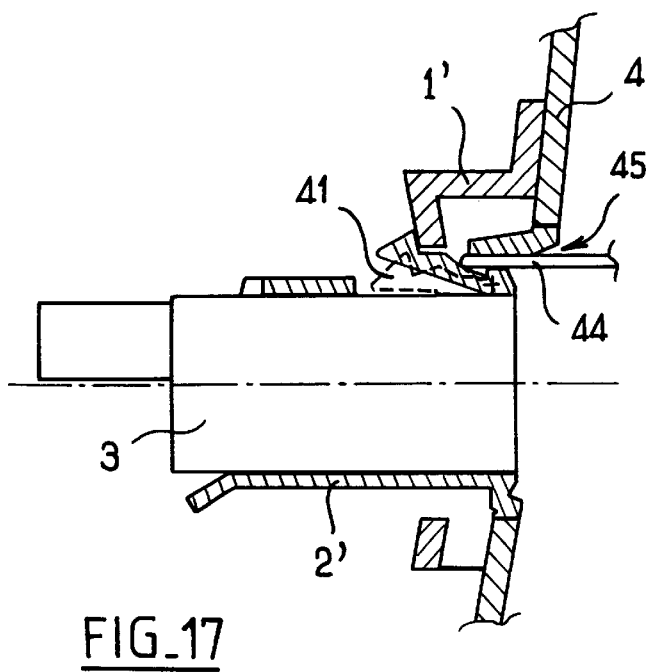
FIG_17
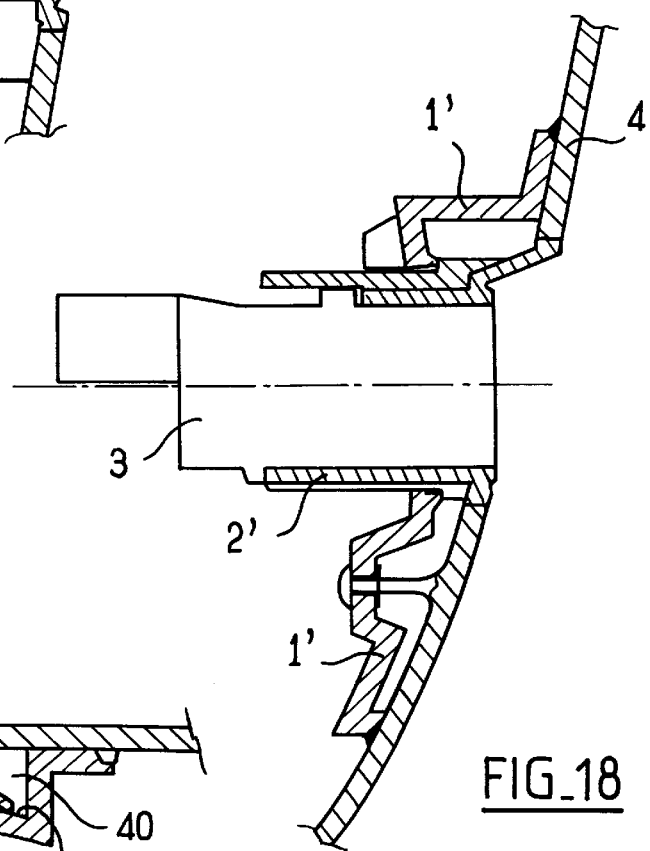
FIG_18
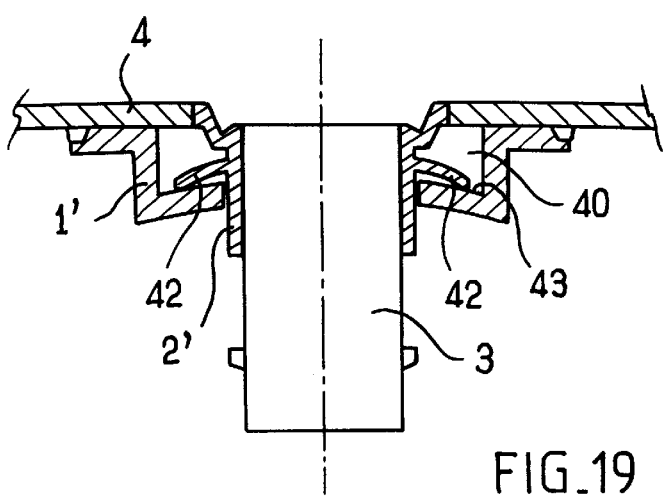
FIG_19

ACCESSORY FIXING DEVICE

The present invention relates both to a device for fixing an accessory, in particular a motor vehicle positioning sensor, and to a bodywork part fitted with such a device.

BACKGROUND OF THE INVENTION

It is known that a positioning sensor a device which is commonly mounted on the bumper(s) of a motor vehicle and which serves to inform the driver of the distance between the bumper(s) and any obstacle situated in front of or behind the vehicle.

Such devices are particularly useful when performing parking maneuvers, and the information is generally supplied to the driver in the form of an intermittent sound signal in which the beeps become closer together with shortening distance between the bumper and the obstacle.

The sensor is situated on the inside of the bodywork part, in register with an orifice formed through said bodywork part.

The sensitive zone, in which obstacles in the vicinity can be detected, extends outwards from the vehicle and its detection field is left clear by the orifice formed in said bodywork part.

In terms of operation, such devices are entirely satisfactory.

However, the way they are mounted on bumpers or, in some vehicles on other bodywork parts, makes them inaccessible from the outside of the vehicle unless the entire bodywork part is dismantled.

In other words, a positioning sensor is mounted and fixed from the inside of the bodywork part, and once said part is in position on the vehicle it is no longer possible to gain access to the fixing members of the sensor in order to dismantle it, e.g. to replace it in the event of a breakdown.

OBJECTS AND SUMMARY OF THE INVENTION

The present invention seeks to provide a novel device for fixing an accessory, in particular a positioning sensor, which enables it to be dismantled from outside the vehicle, without it being necessary to dismantle the bodywork part that supports it.

The present invention provides a device for fixing an accessory such as a positioning sensor to a bodywork part of a motor vehicle, said accessory being found on the side of the bodywork part that faces towards the inside of the vehicle and in register with an orifice made through said bodywork part, the device comprising a jacket suitable for containing the accessory, and a support suitable for being secured to the bodywork part on the side of said bodywork part that faces towards the inside of the vehicle, the jacket containing the accessory being suitable for being received inside the support by being inserted from the outside of the vehicle through the orifice formed in the bodywork part, said jacket containing the accessory also being suitable for being withdrawn from the support from the outside of the vehicle by being extracted through the orifice formed in the bodywork part.

In other words, the present invention consists in interposing a mechanism between the accessory and the bodywork part, which mechanism is organized to allow the accessory to be inserted and extracted from outside the vehicle.

The accessory in question can be constituted by a positioning sensor, however the invention is not limited to that type of electrical accessory, and it applies, for example, to fixing other types of sensor to the vehicle, or indeed an antenna, for example.

In a particular embodiment of the invention, the jacket has at least one passage in its thickness enabling an extractor tool to be inserted from the outside of the vehicle, said tool making it possible via the orifice for the jacket containing the accessory to be released or withdrawn from the support secured to the bodywork part.

In a particular embodiment of the invention, the support or the jacket includes locking means for locking the jacket when inserted in the support.

This locking means is accessible from the outside of the vehicle by a tool passing through the passage formed in the thickness of the jacket.

In a preferred variant of this embodiment, the support or the jacket further includes a resilient member which urges the jacket out from the vehicle when said jacket is inserted in the support, such that releasing the locking member causes the jacket to be expelled at least in part from the support to the outside of the vehicle, thereby enabling it to be grasped and extracted completely from the support.

In another variant, the tool which penetrates through the passage formed in the thickness of the jacket bear against an abutment of the jacket and enables the jacket to be extracted by applying traction directed towards the outside of the vehicle.

For example, the tool can be engaged to extend beyond the inside end of the jacket and can bear against the end thereof or against the accessory itself, such that traction exerted on the tool then gives rise to thrust on the jacket or the accessory.

The present invention also provides a bodywork part, in particular a bumper, provided with a device for fixing an accessory as described above.

BRIEF DESCRIPTION OF THE DRAWINGS

To make the invention better understood, there follows a description of embodiments given as examples that do not limit the scope of the invention, and with reference to the accompanying drawings, in which:

FIG. 1 is an exploded three-quarters rear perspective view of a fixing device constituting a first embodiment of the present invention;

FIG. 2 is an exploded three-quarters front perspective view of the same device;

FIGS. 3 and 4 are section views of FIGS. 1 and 2;

FIGS. 5 and 6 are views analogous to FIG. 4 showing the device while it is being mounted on a bumper;

FIG. 7 is a three-quarter rear perspective view of the sensor and the jacket;

FIG. 8 is a three-quarter front perspective view of the sensor and the jacket;

FIG. 9 is a three-quarter front view of the device in the assembled state;

FIG. 10 is a three-quarter rear view of the device in the assembled state;

FIG. 11 is a perspective view of a tool for dismantling the jacket;

FIGS. 12 to 14 are sections analogous to FIG. 4 showing the jacket in the process of being dismantled;

FIG. 17 is a section view on XVII—XVII of FIG. 16;

FIG. 18 is a section view of XVIII—XVIII of FIG. 16;

FIG. 19 is a section view on XIX—XIX of FIG. 16;

MORE DETAILED DESCRIPTION

Figure 15:
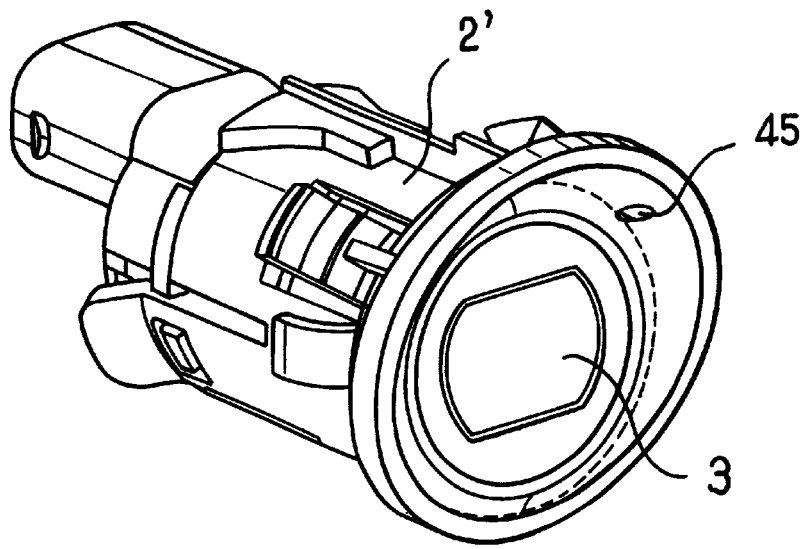
FIG. 15 is a three-quarter front perspective view of a device constituting a second embodiment of the invention.
Figure 16:
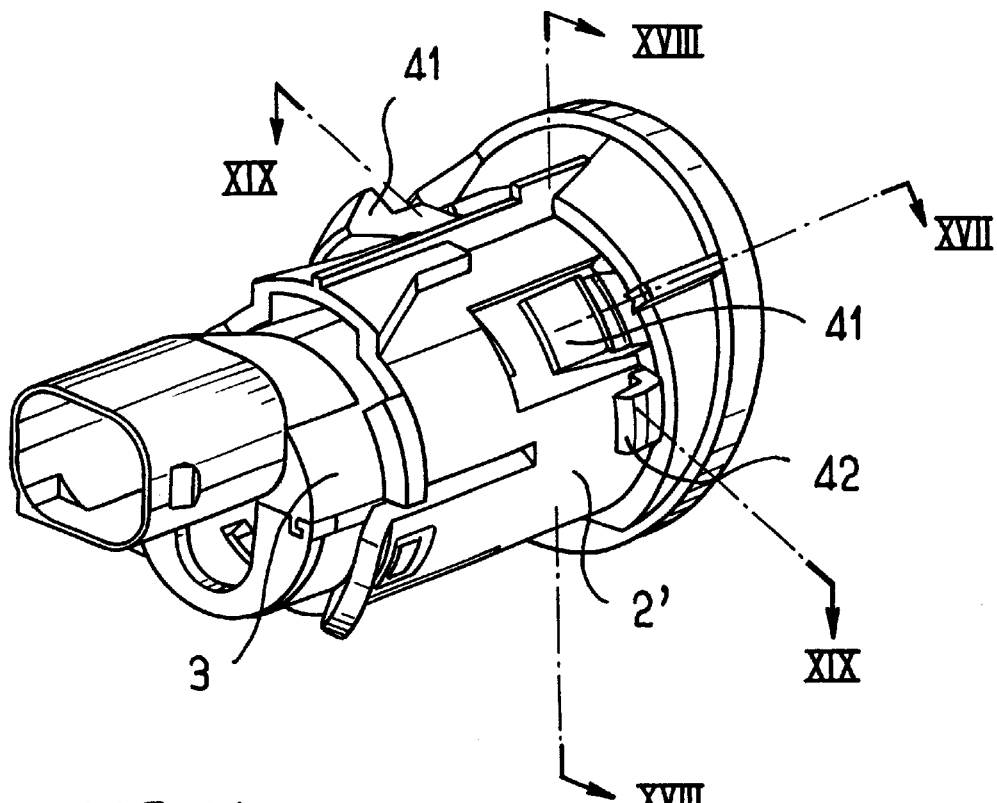
FIG. 16 is a three-quarter rear perspective view of the same device.
Figure 20:
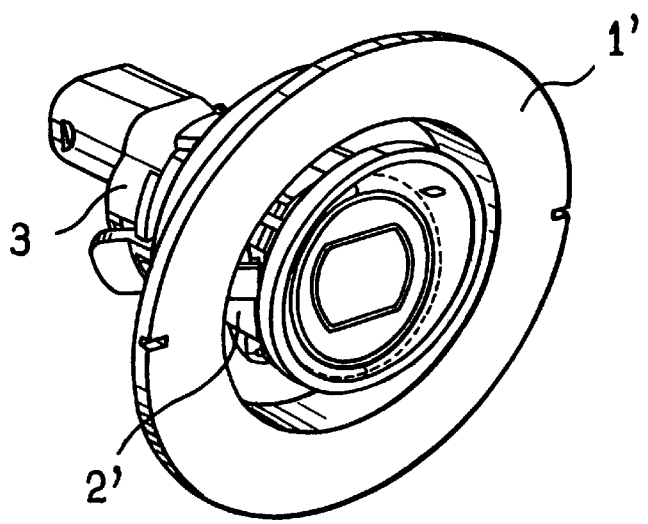
FIG. 20 is a three-quarter front perspective view of the jacket mounted in the support.
Figure 21:
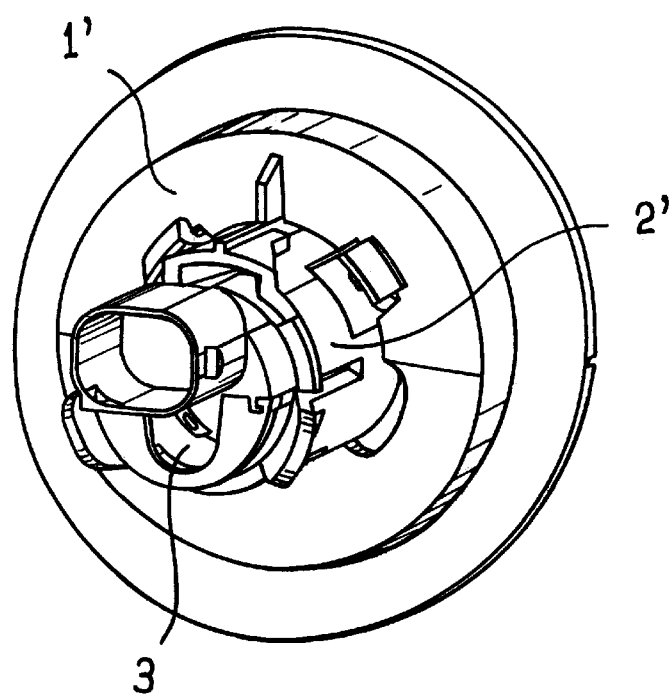
FIG. 21 is a three-quarter rear perspective view of the jacket mounted in the support.

In the first embodiment shown in FIGS. 1 to 19, the device comprises a support 1 and a jacket 2 suitable for receiving a positioning sensor 3.

By convention, the front and rear faces of the elements described refer to their end faces pointing respectively towards the outside and towards the inside of the vehicle.

The support 1 and the jacket 2 are made of injected plastics material.

The support 1 is designed to be fitted to the wall of a bumper 4, as can be seen in FIGS. 3, 4, 5, 6, 12, 13, or 14, e.g. by heat-sealing around its periphery.

The support 1 is substantially in the form of a hollow cylinder provided on the inside with keying shapes which co-operate with corresponding shapes provided on the outside of the jacket 2.

Specifically, the inside wall 5 of the support 1 has a top setback 6 which coincides with extra thickness 7 on the wall of the jacket 2, two bottom lateral setbacks 8 which co-operate with sloping edges 9 of two tongues 10 of the jacket 2, and a bottom setback 11 which corresponds to bottom extra thickness 12 of the jacket (see FIG. 7).

A flared collar 13 terminates the support 1 at its front face 14.

The overall shape of the jacket 2 is that of a cylindrical tube.

In its top region where the wall 36 is thicker, the jacket has two longitudinal through passages 15 which extend from the front face 16 of the jacket to its rear face 17.

A window 18 is cut out in the outside wall of each of the passages 15 and opens out into the corresponding passage.

A flared collar 19 terminates the jacket 2 at its front face 16.

The wall 36 of the jacket 2 also has two resilient tongues 10 cut out longitudinally from the rear face 17 of the jacket 2, which tongues 10 are terminated by respective sloping edges 9 that project from the outside wall of the jacket 2 and are received in the setbacks 8 provided for this purpose in the support 1 once the jacket 2 has been inserted in the support 1.

Each of the tongues 10 is provided with a through window 20.

The wall of the jacket has a plurality of axial cutouts for positioning and holding the sensor 3 which is engaged in the jacket via its rear face.

A V-shaped first cutout 21 serves to guide the sensor 3 in rotation while it is being inserted into the jacket by engaging a stud 22 on the sensor 3 which is received against the end of said V-shaped cutout 21:

The sensor also has an annular abutment 23 which bears against an axial shoulder 24 of the jacket, formed in the thickness of the top half of the jacket, and set back from the rear face 17 of the jacket.

A like annular abutment 25 extends over a larger angle (about 90°) from the bottom portion of the sensor so as to bear against a shoulder 26 of the wall of the jacket.

Finally, two annular studs 27 axe provided in register with the windows 20 of the resilient tabs 10 of the jacket so as to penetrate therein when the sensor is inserted in the jacket.

Furthermore, projecting from its rear face 28, the sensor has a connection portion 29 which is not described in greater detail herein.

To mount the sensor on a bumper, the steps illustrated in FIGS. 5 and 6 are performed.

Initially, as shown in FIG. 5, the support 1 is secured to the bumper 4, e.g. by heat-sealing the periphery of its collar 13 in the thickness of the wall of the bumper.

The sensor 3 is then inserted into the jacket 2 and is guided in rotation by its top stud 22 which is held in the forward direction by the shoulders 24 and 26 of the jacket against which the annular abutments 23, 25 of the sensor 3 come to bear, and which is held in the rearward direction by the annular studs 27 which engage in the windows 20 of the tongues 10 by deforming the tongues 10.

The assembly constituted by the sensor 3 and the jacket 2 containing it, as shown in FIGS. 7 and 8, is then inserted into the support, as shown in FIG. 6.

The jacket 2 is inserted into the support until its flared collar 19 comes to bear against the flared collar 13 of the support. As can be seen in FIGS. 4, 5, and 6, the support has two spherical protuberances 30 projecting from its top setback 6, which protuberances lie on the path of the windows 18 during insertion of the jacket in the support.

During insertion, the two protuberances 30 are retracted by the support deforming so as to allow the outside wall of the jacket to pass.

Once the jacket comes into abutment via its collar 19, the windows 18 of the jacket come into register with the protuberances which therefore move back into position and prevent the jacket from moving in the support.

It can be seen that the invention makes it possible to mount the sensor on the bumper from the front face of the bumper.

After insertion, an assembly is obtained as shown in FIGS. 9 and 10.

To dismantle the sensor from outside the bumper, a tool 32 is used, as shown in FIG. 11, the tool comprising a handle 33 in the form of an oval plate and two parallel legs 34 each terminated by a rigid foot 35 extending outwards perpendicularly to the legs.

Each leg 34 of the tool is inserted in a respective one of the two longitudinal through passages 15 until its rigid foot 35 comes out of the rear face 17 of the jacket.

To be inserted, the tool is subject to a small amount of elastic deformation whereby the ends of its legs 35 are moved towards each other to insert the rigid feet 35 into the longitudinal through passages 15.

Once the rigid feet 35 project beyond the rear face 17 of the jacket 35, the two legs of the tool return to their initial shape and the rigid feet bear against the rear face of the jacket.

The tool is then in the position shown in FIG. 13.

All that then remains to be done is to pull on the tool so as to withdraw the jacket from the support, with the protuberances 30 retracting in the same manner as they do during assembly.

In a variant not shown, each protuberance 30 has a cylindrical base terminated by a spherical head which penetrates into the section of each longitudinal passage 15 and which is pushed upwards by the tool 32 whose legs 34 occupy the entire thickness of the longitudinal passages, thereby making it easier to retract the protuberances, while preventing the sensor being dismantled in untimely manner.

As described above, by using the device of the invention, not only can the sensor be put into place from the front of the bumper, it can also be dismantled therefrom.

In the embodiment of FIGS. 15 et seq., the jacket 2' and the support 1' are of a structure that is different from that described above.

Firstly, as can be seen in FIGS. 18, 19, 20, and 21, the support 1' is restricted to a hollow ring which is secured to the bumper but which does not have any portion that is visible from outside the bumper.

Said ring 1' is heat-sealed or stuck against the rear face of the bumper.

The ring 1' defines an annular housing 40 set back from the wall of the bumper 4.

The jacket 2' is shaped so as to come flush with the wall of the bumper, snap-fastening on the ring 1' which constitutes the support.

To this end, the jacket 2 has, projecting from its outer wall, two hook-shaped resilient tongues 41 and two rearwardly-directed resilient tabs 42.

As can be seen in FIG. 17, the resilient hooks 41 snap-fasten the jacket in the ring, merely by inserting one in the other.

Simultaneously, as shown in FIG. 14, the resilient tabs 42 bear against the front wall 43 of the ring 1' and spread out resiliently in the annular housing 40 defined by the ring, thereby applying a reaction force on the jacket 2' tending to urge it back out from the bumper. This reaction force is maintained so long as the jacket is snap-fastened in the ring.

As can be seen in FIG. 17, by inserting a tool 44 of appropriate shape in the through longitudinal passages 45 of the jacket, the hooks 41 are retracted and the jacket 2' is released so that under the effect of the reaction force from the resilient tabs 42 pressing against the ring, the jacket is automatically expelled from the ring over a distance that is sufficient to enable it to be grasped and extracted by hand.

The other elements of the device constituting this embodiment and given the same reference numerals as in FIGS. 1 to 14 are considered as being identical to the corresponding elements of the first embodiment.

It can be seen that this embodiment also makes it possible for the positioning sensor to be mounted and dismantled from the outside of the bumper.

Naturally, the embodiments described above are not limiting in any way and any desirable modification can be made thereto without thereby going beyond the ambient of the invention.

In particular, the positioning sensor could be replaced by any type of detector or receiver member, for example.

What is claimed is:

1. An accessory fixing device for fixing an accessory to a side of a bodywork part of a motor vehicle that faces towards the inside of the vehicle and in register with an orifice through said bodywork part, the device comprising:
   a jacket suitable for containing the accessory; and
   a support suitable for being secured to the bodywork part on the side of said bodywork part that faces towards the inside of the vehicle;
   the jacket being suitable for being received inside the support by being inserted from outside of the vehicle through an orifice in the bodywork part while containing the accessory, said jacket also being suitable for being withdrawn from the support from the outside of the vehicle by being extracted through the orifice in the bodywork part while containing the accessory;
   wherein the jacket has at least one passage in its thickness enabling a tool to be inserted from the outside of the vehicle, said tool making it possible for the jacket to be released or withdrawn from the support secured to the bodywork part via the orifice while containing the accessory.

2. An accessory fixing device according to claim 1, wherein the accessory is a positioning sensor.

3. An accessory fixing device according to claim 1, wherein the support or the jacket includes locking means for locking the jacket when the jacket is inserted in the support.

4. An accessory fixing device according to claim 3, wherein the locking means is accessible by a tool from outside the vehicle by passing the tool through said passage.

5. An accessory fixing device according to claim 3, wherein the support or the jacket further includes a resilient member which urges the jacket out from the vehicle when said jacket is inserted in the support, such that releasing the locking member causes the jacket to be expelled at least in part from the support to the outside of the vehicle, thereby enabling the jacket to be grasped and extracted completely from the support.

6. An accessory fixing device according to claim 3, wherein the tool can bear against an abutment of the jacket to enable the jacket to be extracted by applying traction directed towards the outside of the vehicle.

7. A bodywork part of a motor vehicle provided with an accessory fixing device in accordance with claim 1.

8. A bodywork part according to claim 7, wherein the accessory is a positioning sensor.

9. A bodywork part according to claim 7, wherein said bodywork part is a bumper.

10. An accessory fixing device comprising:
    a jacket suitable for containing an accessory, the jacket having a wall, the wall having at least one passage in its thickness; and
    a support suitable for receiving the jacket while the jacket contains the accessory, the support having an orifice, the orifice having a first side and a second side, a length of the support extending away from the first side in a direction of the second side, the jacket being suitable for insertion into the support through the orifice from the first side while containing the accessory, the length of the jacket extending from the first side to the second side, at least one passage enabling a tool to be inserted from the first side to release or remove the jacket from the support and withdraw the jacket through the orifice in the direction of the first side while the jacket contains the accessory.

11. The accessory fixing device according to claim 10, wherein the accessory is a positioning sensor.

12. The accessory fixing device according to claim 10, wherein at least one of the support and the jacket includes locking means for locking the jacket when inserted in the support.

13. The accessory fixing device according to claim 12, wherein the locking means is accessible by the tool inserted from the first side and passing through the at least one passage.

14. The accessory fixing device according to claim 12, wherein the support or the jaket further includes a resilient member which urges the jacket out from the support when said jacket is inserted in the support such that releasing the locking member cause s the jacket to be expelled at least in part from the support, thereby enabling the jacket to be grasped and extracted completely from the support.

15. The accessory fixing device according to claim 12, wherein the tool penetrates through the passage formed in the thickness of the jacket and bears against an abutment of the jacket and enables the jacket to be extracted by applying traction directed towards the first side.

16. An accessory fixing device in combination with a mounting part;
   the mounting part comprising an orifice, a first side and a second side; and
   the accessory fixing device comprising:
      a jacket suitable for containing an accessory, the jacket having a wall, the wall having at least one passage in its thickness; and
      a support suitable for receiving the jacket while the jacket contains the accessory, the support being attached to the mounting part at the orifice such that the length of the support extends away from the second side in the direction of the first side, the jacket being inserted into the support through the orifice from the second side while containing the accessory, the at least one passage enabling a tool to be inserted from the second side to release or remove the jacket containing the accessory from the support and withdraw the jacket containing the accessory through the mounting part in the direction of the second side.

17. The accessory fixing device according to claim 16, wherein the device contains the accessory and the accessory is a positioning sensor.

18. The accessory fixing device according to claim 16, wherein at least one of the support and the jacket includes locking means for locking the jacket in the support.

19. The accessory fixing device according to claim 18, wherein the locking means is accessible by the tool inserted from the second side and passing through the at least one passage.

20. The accessory fixing device according to claim 18, wherein the support or the jacket further includes a resilient member which urges the jacket out from the support when said jacket is in the support, such that releasing the locking member causes the jacket to be expelled at least in part from the support, thereby enabling the jacket to be grasped and extracted completely from the support.

21. The accessory fixing device according to claim 18, wherein the tool penetrates through the passage formed in the thickness of the jacket to bear against an abutment of the jacket and enables the jacket to be extracted by applying traction directed towards the second side.

* * * * *